(12) United States Patent
Arippol

(10) Patent No.: US 10,071,570 B2
(45) Date of Patent: Sep. 11, 2018

(54) METHOD FOR OBTAINING SELF-ADHESIVE BOOKLET-LABEL TAPE, WITHOUT BACKING AND PROTECTION TAPE

(71) Applicant: Giuseppe Jeffrey Arippol, São Paulo (BR)

(72) Inventor: Giuseppe Jeffrey Arippol, São Paulo (BR)

(*) Notice: Subject to any disclaimer, the term of this patent is extended or adjusted under 35 U.S.C. 154(b) by 0 days.

(21) Appl. No.: 15/520,075

(22) PCT Filed: Dec. 3, 2014

(86) PCT No.: PCT/BR2014/050028
§ 371 (c)(1),
(2) Date: Apr. 19, 2017

(87) PCT Pub. No.: WO2015/192193
PCT Pub. Date: Dec. 23, 2015

(65) Prior Publication Data
US 2017/0313101 A1    Nov. 2, 2017

(30) Foreign Application Priority Data
Nov. 5, 2014    (BR) .............................. 102014027603

(51) Int. Cl.
*B41J 11/00*    (2006.01)
*B41J 3/407*    (2006.01)
(Continued)

(52) U.S. Cl.
CPC ............... *B41J 11/002* (2013.01); *B32B 7/12* (2013.01); *B32B 37/12* (2013.01);
(Continued)

(58) Field of Classification Search
CPC ... B32B 37/12; B32B 38/0008; B32B 43/006; B32B 2519/00; B43J 3/4075; B65C 9/46
(Continued)

(56) References Cited

U.S. PATENT DOCUMENTS

| 5,569,515 A | 10/1996 | Rice, II et al. |
| 5,651,852 A | 7/1997 | Mitchell et al. |

(Continued)

FOREIGN PATENT DOCUMENTS

| BR | 9201533 A | 11/1993 |
| BR | 9711041 A | 1/2000 |

(Continued)

*Primary Examiner* — Huan Tran
*Assistant Examiner* — Alexander D Shenderov
(74) *Attorney, Agent, or Firm* — Law Offices of John Stattler, PC

(57) ABSTRACT

The present abstract relates to a patent of invention for a method for obtaining a tape (1) for self-adhesive, linerless leaflet labels, pertaining to the field of self-adhesive articles, comprising: 1)—Providing and unwinding a self-adhesive-material tape (20); 2)—Printing labels (4) and sensing marks (6) on the tape (3) of the tape (20); 3)—Applying an adhesion control layer (40) to the printed face of the tape (3), preferably comprised by laminating a BOPP-film tape; 4)—Delaminating the liner (10) from the tape (20); 5)—Inverting the position of the liner (10) in relation to the remaining tape of the self-adhesive-material tape (20); 6)—Applying a layer (50) of adhesive to the face of the liner (10) that includes Corona treatment (13), facing the tape (3); 7)—Drying the adhesive (50); 8)—Applying the leaflets (7) to the tape (3) in correspondence with respective labels (4); 9)—Relaminating the liner (10); 10)—Slitting the leaflet-label linerless self-adhesive tape (1) obtained; and 11)—Winding up the finished self-adhesive linerless leaflet-label tape (1) to form the reel (11).

6 Claims, 7 Drawing Sheets

(51) Int. Cl.
*B32B 37/12* (2006.01)
*B32B 7/12* (2006.01)
*B32B 38/00* (2006.01)
*B65C 9/46* (2006.01)
*B32B 43/00* (2006.01)

(52) U.S. Cl.
CPC ........ *B32B 38/0008* (2013.01); *B32B 43/006* (2013.01); *B41J 3/4075* (2013.01); *B65C 9/46* (2013.01); *B32B 2519/00* (2013.01)

(58) Field of Classification Search
USPC ........................................................ 347/102
See application file for complete search history.

(56) References Cited

U.S. PATENT DOCUMENTS

| | | | |
|---|---|---|---|
| 5,663,227 | A | 9/1997 | Birkholz et al. |
| 5,733,615 | A | 3/1998 | Rackovan et al. |
| 5,792,296 | A * | 8/1998 | Soltysiak ............. B05C 5/0254 |
| | | | 118/325 |
| 6,408,553 | B1 | 6/2002 | Brown et al. |
| 2002/0048675 | A1 | 4/2002 | Schumacher |
| 2002/0062898 | A1 | 5/2002 | Austin |
| 2005/0199344 | A1 | 9/2005 | Loerd |
| 2016/0257860 | A1* | 9/2016 | Rink ...................... B31D 1/021 |

FOREIGN PATENT DOCUMENTS

| | | |
|---|---|---|
| BR | PI0902205 A2 | 3/2011 |
| CA | 2233801 A1 | 11/1998 |
| JP | 2013100142 A | 5/2013 |
| WO | 9931645 A1 | 6/1999 |
| WO | 0007807 A1 | 2/2000 |
| WO | 2010012036 A1 | 2/2010 |

\* cited by examiner

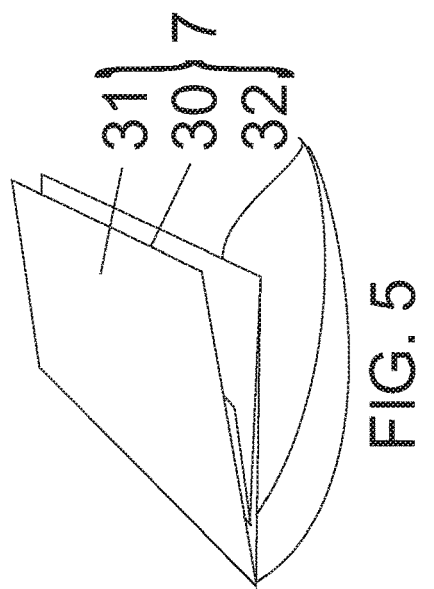
FIG. 5
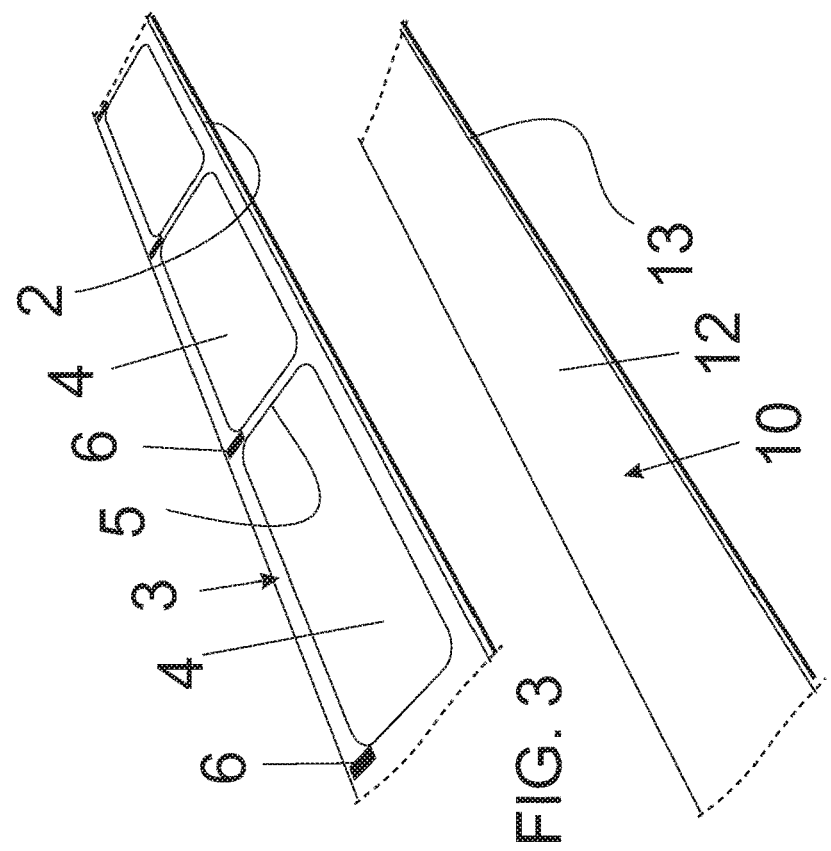
FIG. 3
FIG. 4

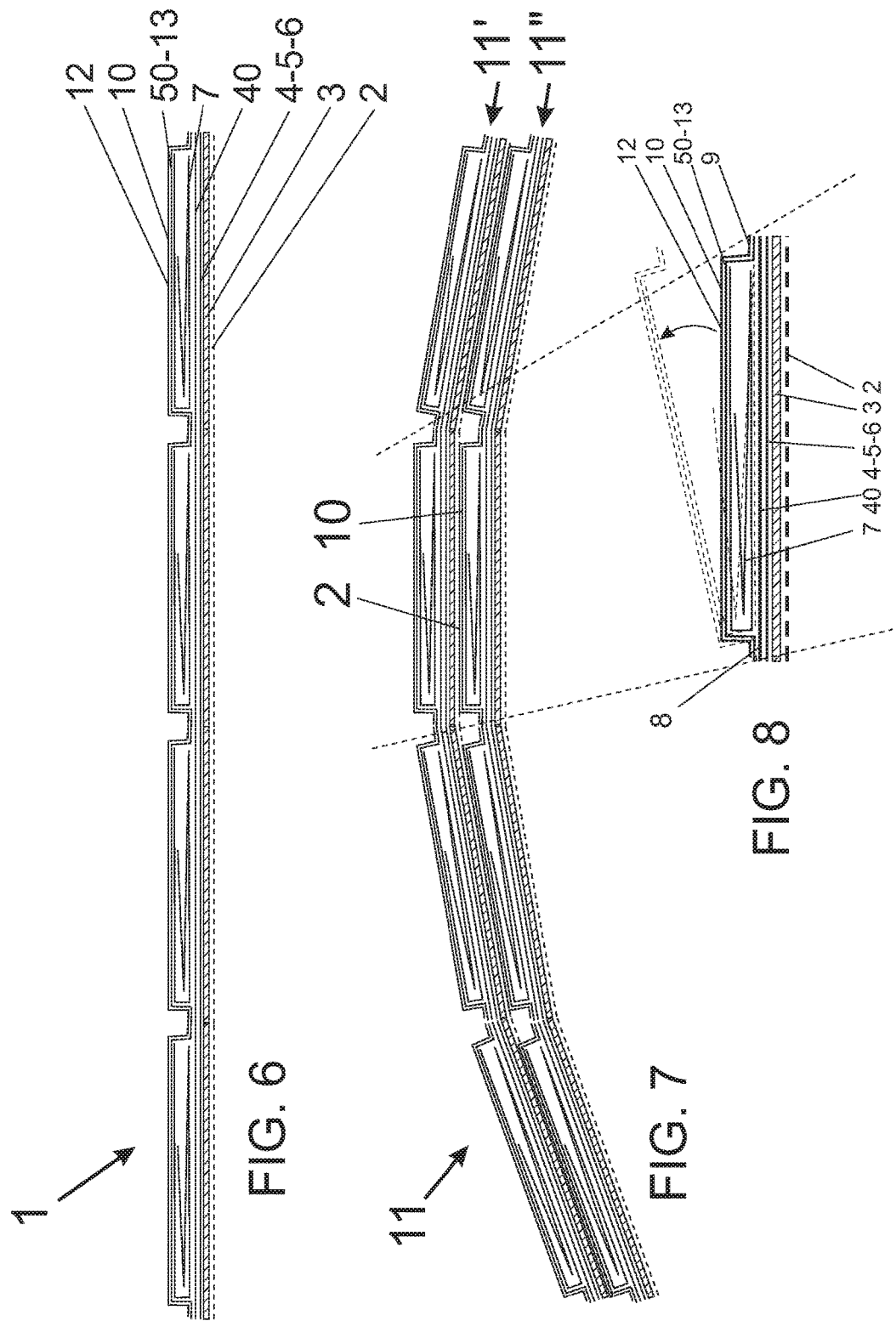

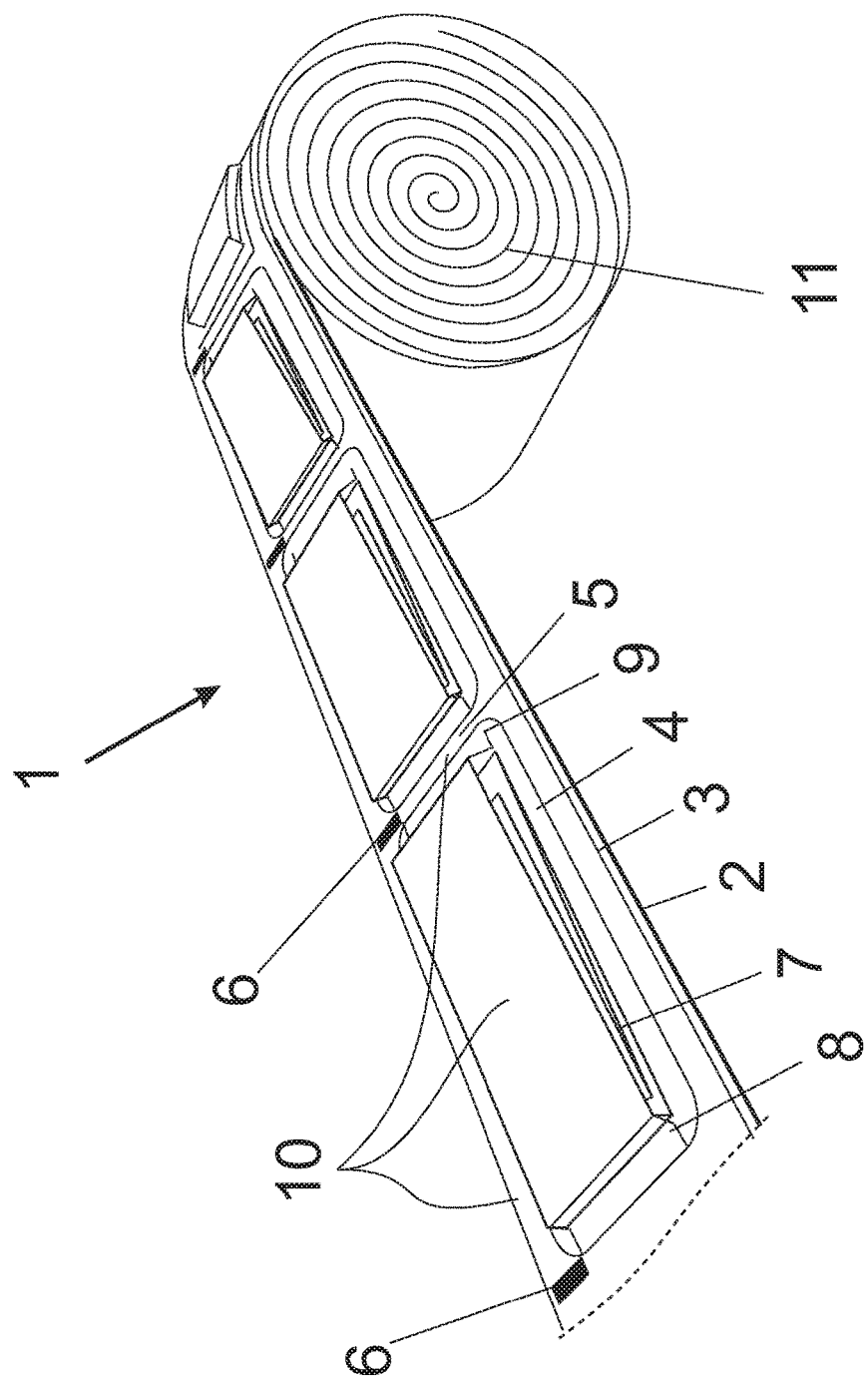

METHOD FOR OBTAINING SELF-ADHESIVE BOOKLET-LABEL TAPE, WITHOUT BACKING AND PROTECTION TAPE

This specification relates to a patent of invention for the process of obtaining self-adhesive leaflet-label tape without backing tape, linerless, belonging to the field of self-adhesive products and is designed to provide benefits in comparison with the usual processes.

A self-adhesive label, without backing tape and protection and liner, called linerless label, is already known. Such label is provided as a tape that has a succession of printed self-adhesive labels, the boundaries between which are provided for sensing marks that work in collaboration with the applicator equipment sensor; said tape is provided with a pressure-sensitive rear adhesive layer and prior non-stick material layer and is provided in the reel, such that when the label tape is wound to form the reel, the pressure-sensitive rear adhesive layer of a turn in which the reel is bonded so as to be detached over the previous non-stick material layer of a reel lower turn, thus dispensing the liner. The advantage of the label or linerless label tape is that it does not give rise to disposables in a labeling process, thus solving the inconvenience noticed in labels with liner. Furthermore, a reel of linerless labels can contain larger amounts of labels as compared to a reel of labels with liner due to the absence of the latter. These are desirable advantages for the users of this type of label.

The applicant of the present patent application is a patent holder, PI 0902205-8, for process for obtaining label or tag or similar self-adhesive tapes without backing and protection tape, comprised substantially of providing a self-adhesive material tape consisting of paper or plastic tape in which the front face print is based; a pressure-sensitive adhesive layer adhered the rear face of the tape; and a liner of thin transparent plastic film affixed thereon so the adhesive layer is movable and said patented process is realized substantially by the steps of: printing the labels on the tape; applying adhesive on the printing; delamination, lateral displacement, overlapping and re-lamination of the liner on the printed front face with the labels of paper or plastic tape made by suitable sets of delamination rollers, direction changing bars and re-lamination of liner; and re-rewinding the finished label or tag or similar tape. This process has shown to be highly effective for the purpose it is intended.

On the other hand, it is also known the so-called self-adhesive linerless leaflet-label, basically comprised of: pressure-sensitive rear layer; a tape having the adhesive layer; a printed layer on the tape in the form of successive labels limited in relation to each other by transverse bands in which sensing marks are located that collaborate with the sensor of the equipment for label application; leaflet applied on respective labels, each provided with an extreme band permanently bonded and the extreme band of the opposite cover resealably affixed in side bands to the left and right label, respectively; and liners over the leaflet covers and transverse bands separating labels, so that the formation of the linerless leaflet-label, the rear adhesive on one reel turn is bonded so as to be detached from the liner of the leaflets and bands separating the labels of the next turn.

The usual process of manufacturing linerless leaflet-labels can use plastic or paper film tape, which will compose the label tape; provide steps of applying rear adhesive; printing and applying adhesive on front face; bonding leaflets on front adhesive; applying release material on the covers of the leaflets and others, thus resulting in a relatively complex process and unsuitable costs.

Thus, the main object of the present patent is to provide a process for obtaining self-adhesive linerless leaflet-label tape that is simple in comparison with others.

Another object is to provide a low-cost obtaining process.

In order to meet these and other objectives, the applicant contemplated the possibility of using the solutions of the patented process referred to above for obtaining self-adhesive linerless leaflet-label tape of the present application.

Thus, in view of the aspects and objectives above and for the purpose of meeting them, the process for obtaining self-adhesive leaflet-label tape without backing and protection tape, object of the present patent has been developed, which is substantially comprised of solutions used in the aforementioned patent of the same applicant, conveniently adapted and associated, additionally to new suitable solutions for obtaining the self-adhesive linerless leaflet-label. The process is described in further detail below, based on the accompanying drawings.

The process as provided in the present patent application results in a simple solution in comparison to others, thus meeting the main object of the present patent.

Thus, the present process, due to its simplicity, results in a relatively low cost, thus meeting another object of the invention.

The accompanying drawings relate to the process for obtaining self-adhesive leaflet-label tape without backing and protection tape, object of the present patent of invention, in which:

FIGS. 3 and 4 show details of two tapes formed at the end of the delamination step (four) of the process;—

FIG. 5 shows a schematic detail of a leaflet comprising the label obtained by the process;—

FIG. 6 shows a detailed side sectional view of the self-adhesive linerless leaflet-label tape formed by the process;—

FIG. 7 shows two adjacent turns of the self-adhesive linerless leaflet-label tape forming the reel;—

FIG. 8 shows a self-adhesive linerless leaflet-label formed by the process; and—

FIG. 9 shows a scheme of a usual self-adhesive linerless leaflet-label tape.

Figure 1:
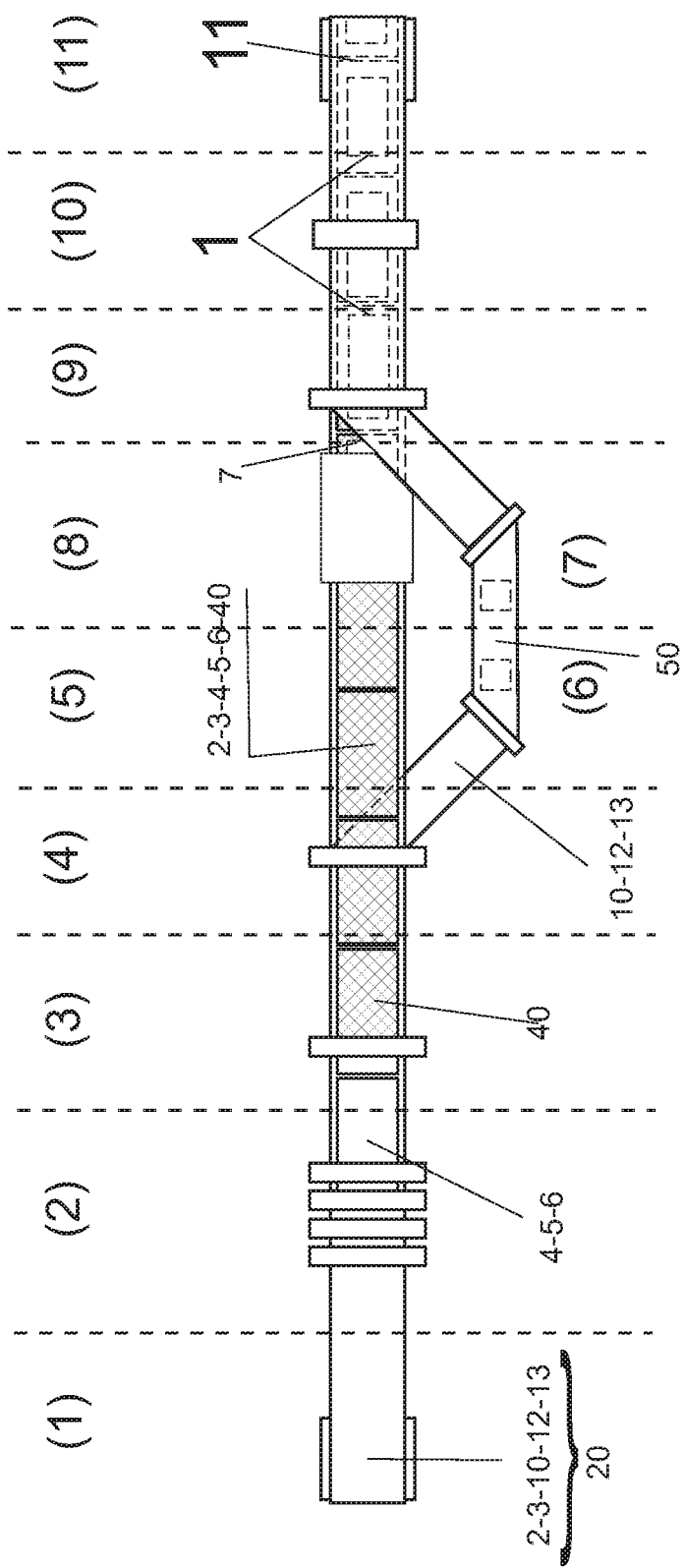
FIG. 1 shows a blueprint design of the process scheme;—

As it is provided in the invention and illustrated in the figures referred to above, the process object of the present patent of invention is intended for manufacturing self-adhesive leaflet-label tape without backing and protection tape, i.e., linerless, thus configuring a self-adhesive linerless leaflet-label tape.

An usual self-adhesive linerless leaflet-label tape 1 usually is substantially comprised (FIG. 9): of pressure-sensitive rear adhesive layer 2; of tape 3 having the adhesive layer; of printed layer comprising on the tape a series of labels 4 limited regarding each other by a transverse separating band 5 where sensing marks 6 are located; of leaflets 7 bonded on respective labels 4; of extreme bands of the back cover of the leaflet and left side of the label permanently bonded 8 and extreme bands of the front cover of the leaflet and right side of the label resealably affixed 9, in opposition those; and liners 10 embodied on the leaflet covers 7, the areas of the labels not under the leaflets and the space between labels so that, while forming the reel 11 of self-adhesive linerless leaflet-labels, the rear adhesive 2 of a reel turn is reversibly bonded on the liner 10 embodied in the leaflets, the uncovered label areas, (not under the leaflets) and the bands between the labels of the next turn, thus dismissing the use of liner.

Figure 2A:
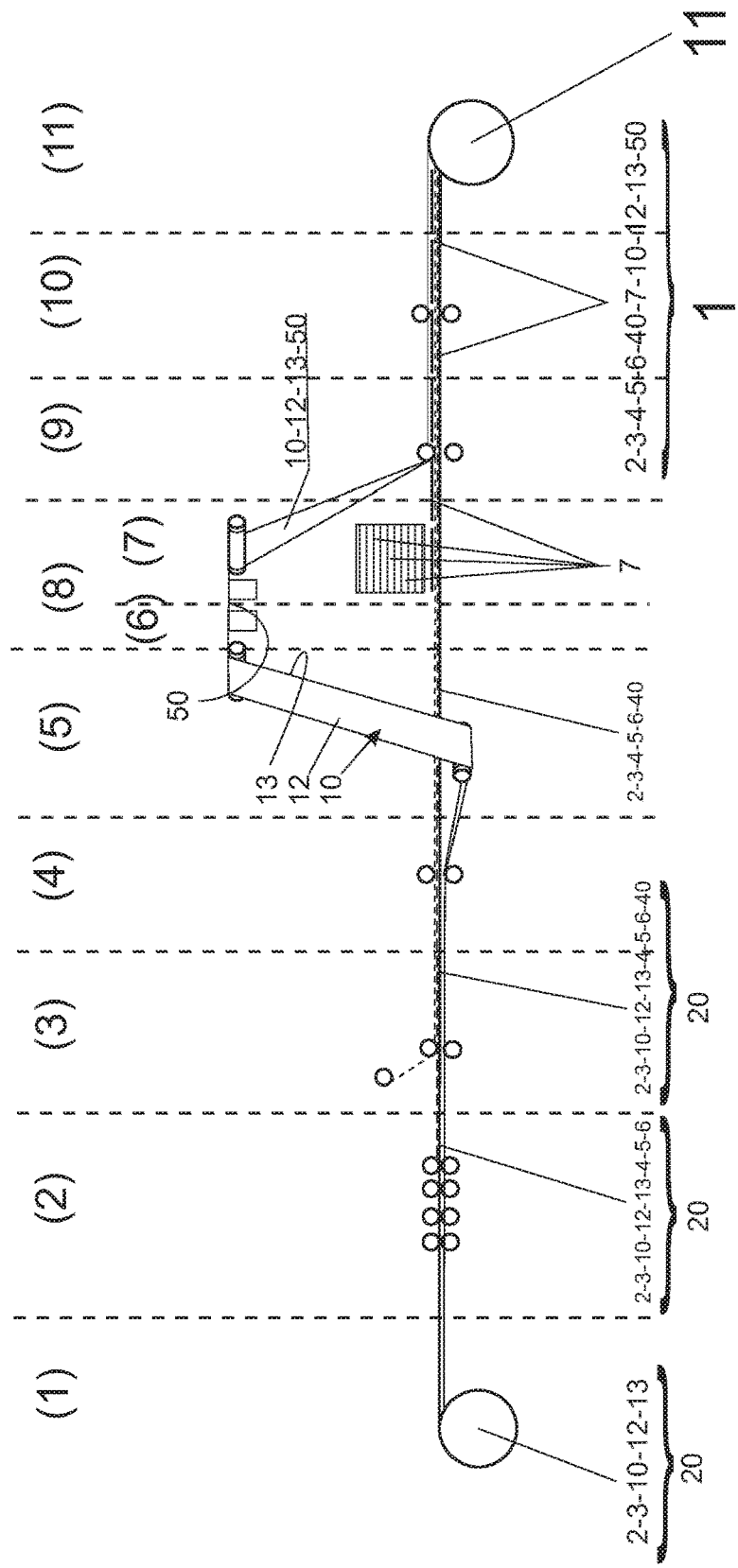
FIG. 2A shows a lateral view of the process scheme;—

The process for obtaining a self-adhesive linerless leaflet-label tape, object of the present patent, (FIGS. 1, 2A) consists of providing a self-adhesive material reel 20, formed by: tape 3 in which front face consists of printed base; pressure-sensitive adhesive layer 2 on the rear face of the tape 3; backing and protection tape, liner, 10 formed by a transparent plastic film tape provided, on a face, with a silicone layer 12, which is reversibly bonded to the adhesive layer 2 and an opposite face, outlined by said liner, having the surface treated with Corona treatment 13.

The process consists of providing also a plurality of leaflets 7 (FIG. 5), each comprised of: leaflet tape 30; front and back printing layers 31, containing the leaflet information; and transverse fold creases 32 around which the front cover, back cover and intermediate segments are folded in zigzag.

The process comprises the steps of (FIGS. 1, 2A):—

1)—Unwinding the self-adhesive material tape 20, formed by tape 3, adhesive layer 2 and liner 10 containing silicone 12 to which the adhesive layer 2 and Corona treatment on the opposite face 13;—

2)—Printing a series of labels 4 and their sensing marks 6 along the tape 3 of the self-adhesive material tape 20 so that said tape 3 is provided with a series of labels 4 separated from each other by space 5, to which sensing marks 6 are applied;—

3)—Applying adhesion control layer 40 all over the printed face area 3, preferably comprised by laminating a transparent adhesive BOPP film tape or by applying adhesive, drying and lamination of the controlled-release BOPP film on the face of the tape 3 having printed labels 4, separated by bands 5 and sensing marks 6;—

4)—Delaminating liner 10 from the self-adhesive material tape 20, forming two tapes: a tape comprised of the liner 10 with a silicone face 12 and another face with Corona treatment 13 (FIG. 4) and a tape comprised of the tape 3 with printed labels 4, separated by the bands 5 and sensing marks 6 and on said printed face an adhesion control layer 40 and rear adhesive 2 (FIG. 3);—

5)—Inverting the position of the liner 10 in relation to the remaining tape from self-adhesive material tape 20, comprised by tape 3 with printings 4, 5, 6, adhesion control layer 40 and adhesive layer 2, i.e., (FIG. 1) diverting the liner 10 out of under the face of the tape 3 containing the adhesive 2, moving it until the positioning above the opposite face of the tape 3 that has printed labels 4, spaces 5 and sensing marks 6, diverting the liner again to a position aligned and above the tape 3, thus maintaining the face containing the silicone 12 opposed to tape 3 and the opposite face containing the Corona treatment 13 facing said tape 3;—

6)—Applying water-based, solvent-based or UV self-adhesive layer 50 on the face of the liner 10 containing the Corona treatment 13;—

7)—Applying UV drying or heat drying to adhesive layer 50, thus forming a tape comprised of original liner 10, in which a face has silicone 12 and the opposite face has Corona treatment 13 and adhesive layer 50 thereon;—

8)—Successively applying the leaflets 7 over the tape 3 registered along with respective labels 4 printed thereon, thus forming a tape comprising: tape 3 provided with a rear adhesive layer 2; a number of labels 4 printed on tape 3 and separated by transverse bands 5 where sensing marks 6 are located; and on labels thus showing respective leaflets 7;—

9)—Relaminating liner 10 so as to be bonded by adhesive layer 50: on the covers of the leaflets 7 placed on printed labels 4 on tape 3; on the adhesion control layer 40 embodied on the bands of the label 4 that are uncovered in relation to the leaflets 7 and over the bands 5 separating the labels 4 and where the sensing marks 6 are located, thus forming the linerless self-adhesive tape 1 further described below based on FIG. 6;—

10)—Slitting self-adhesive linerless leaflet-label tape 1; and—

11)—Winding the finished self-adhesive linerless leaflet-label tape 1 thus forming a reel 11 of self-adhesive linerless leaflet-label tape 1.

A self-adhesive linerless leaflet-label tape 1 (FIG. 6) subsequently formed by the present process is comprised of: rear adhesive layer 2; tape 3 in which rear face has an adhesive layer 2; printed layer on the front face of the tape 3 comprised by a series of labels 4 separated by bands 5 where sensing marks 6 prints are located; adhesion control layer 40 over the printed face of the tape 3; leaflets 7 over respective labels 4; adhesive layer 50; liner 10 formed by the original liner 10, provided with a face with Corona treatment 13 containing the adhesive layer 50 and adhered to the covers of leaflets 7, over the bands of the adhesion control layer 40 on bands of labels 4 uncovered in relation to leaflets 7 and on separating bands 5 between labels 4; said liner 10 comprising original liner 10, with the face containing silicone 12 facing outside.

When said self-adhesive linerless leaflet-label tape 1 is winded forming a reel 11 (FIG. 7), the adhesive layer 2 of an outer turn 11' is glued so as to be able to be detached from the silicone 12 of liner 10 from an inner turn 11" adjacent to the outer turn 11', which provides protection while the reel 11 is formed and enables the tape 1 to be unwinded as its labels 4 are being applied without use of liner.

A self-adhesive linerless leaflet-label 4 (FIG. 8), which is part of the self-adhesive linerless leaflet-label tape 1 illustrated in FIG. 6, formed by the above process is comprised of adhesive layer 2, by the successively overlapping layers: adhesive layer 2; label body 3; printed layer comprising label 4 and sensing mark 6; adhesion control layer 40 formed by laminated transparent BOPP film on the printing comprising labels 4 and marks 6; leaflet 7 over the adhesion control layer 40 of the label 4; adhesive layer 50; liner 10, formed by the original liner 10 of the self-adhesive material tape 20, bonded with adhesive 50 on the cover of the leaflet 7 and with silicone 12 facing outside; said liner 10 has lateral bands extending outside the opposite sides of the leaflet 7, i.e. a left band 8 permanently bonded to the band of the adhesion control layer 40 embodied on the left band of the label 4 extending outside under leaflet 7 to a right band 9 resealably affixed to the band of the adhesion control layer 40 embodied in the right band of the label 4 extending outside under the leaflet 7.

The self-adhesive linerless leaflet-label 4 is applied to a receiving package through a labeling machine (not shown) able to cut the label off the tape and bond it to the package.

In the basic embodiment above described, it is claimed that the process, object of the present patent, can show different materials, dimensions, functional and/or ornamental embodiments, steps and parameters, without departing from the scope of the invention.

Figure 2B:
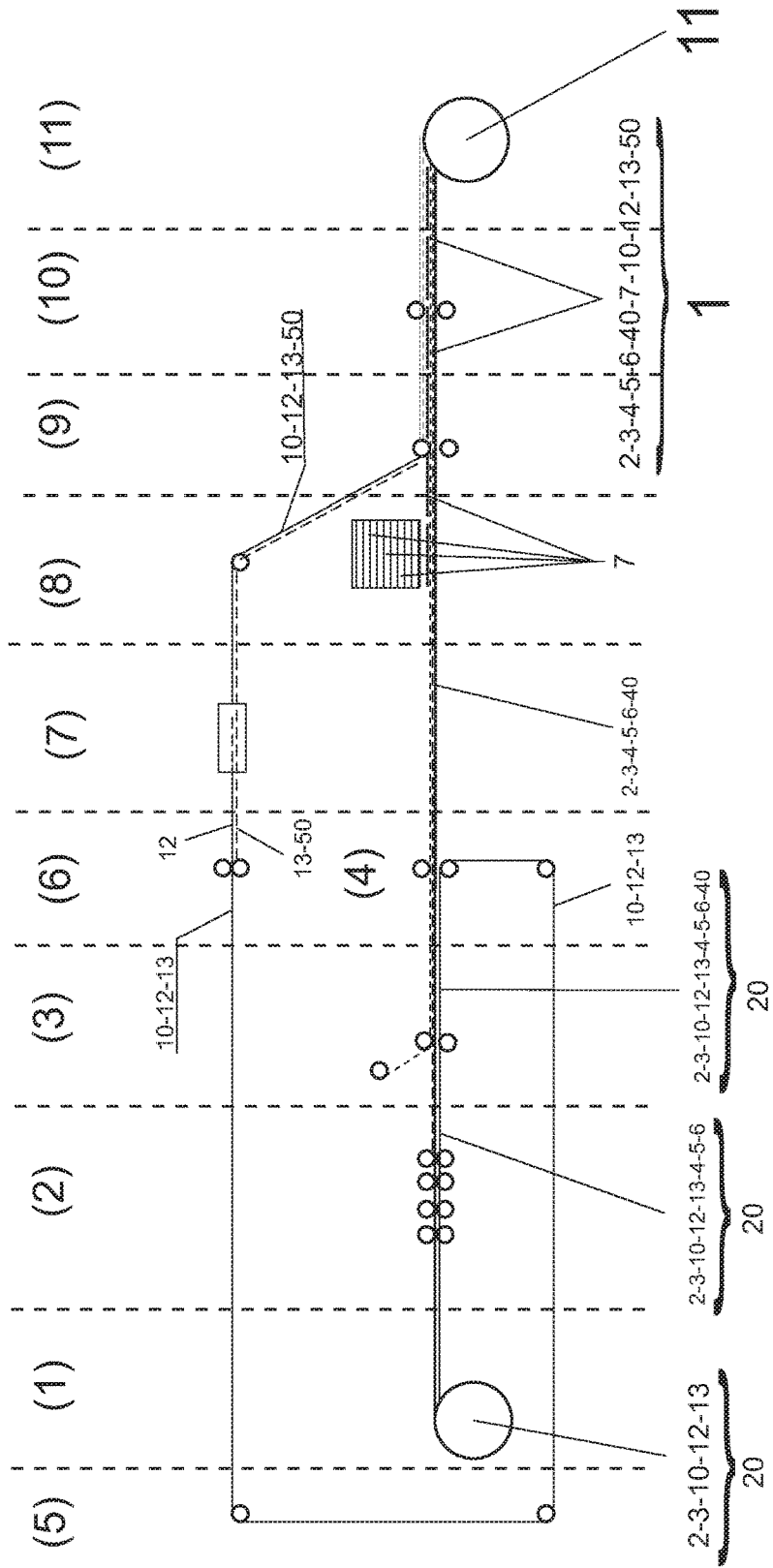
FIG. 2B shows a lateral view of a scheme of an optional version of the process similar to FIG. 2A;—

In that regard, the process can optionally be as illustrated in FIG. 2B, comprising the steps of:—

1)—Unwinding the self-adhesive material tape 20;—

2)—Printing along the tape 3 of the self-adhesive material tape 20 a series of labels 4, space 5 and sensing marks 6;—

3)—Applying adhesion control layer 40 all over the printed face of the tape 3, preferably comprised by the lamination of a transparent BOPP film tape;—

4)—Delaminating the liner 10 of the self-adhesive material tape 20, thus forming two tapes: one tape comprised of liner 10 with a face with silicone 12 and another face with Corona treatment 13 and a tape comprised of the tape 3 with the printings of labels 4, separated by bands 5 and sensing marks 6 and over said printed face embodied in the adhesion control layer 40 and rear adhesive 2, everything according to the first embodiment of the process as described above.

Additionally, this embodiment of the process comprises an inversion step modified in relation to the first embodiment, i.e.:—

5)—Inverting the position of the liner 10 in relation to the remainder of the self-adhesive material tape 20, comprised by tape 3 with printings 4, 5, 6, adhesion control layer 40 and adhesive layer 2, i.e., (FIG. 2B), after the delamination, lowering the liner 10 thus keeping it aligned with and under the self-adhesive material tape 20, diverting the liner 10 and placing it against the flow of the self-adhesive material tape 20 until the position anterior to the unwinding axis; diverting the liner 10 and placing it in the position aligned with and above the position of the self-adhesive material tape 20, in which said liner 10 has the silicone surface 12 opposite to the self-adhesive material tape 20 and the opposite surface with Corona treatment 13 facing the latter, diverting the liner 10 to the same direction as the self-adhesive material tape 20.

From this modified inversion step, the other steps are the same as the first version:—

6)—Applying the water-based self-adhesive layer, solvent-based or UV (50) on the face of the liner 10 containing the Corona treatment 13;—

7)—Applying UV drying or heat drying;—

8)—Successively applying the leaflets 7 over the tape 3 registered along with respective labels 4 printed thereon,—

9)—Relaminating liner 10 so as to be bonded by adhesive layer 50 on the covers of the leaflets 7 on labels 4 printed on the printed tape 3; on the adhesion control layer 40 embodied on the bands of the label 4 that are uncovered in relation to the leaflets 7 and over the bands 5 separating the labels 4 and where the sensing marks 6 are located, thus forming the linerless self-adhesive tape 1;—

10)—Slitting self-adhesive linerless leaflet-label tape 1; and—

11)—Winding the finished self-adhesive linerless leaflet-label tape 1 thus forming a reel 11 of self-adhesive linerless leaflet-label tape 1.

Figure 2C:
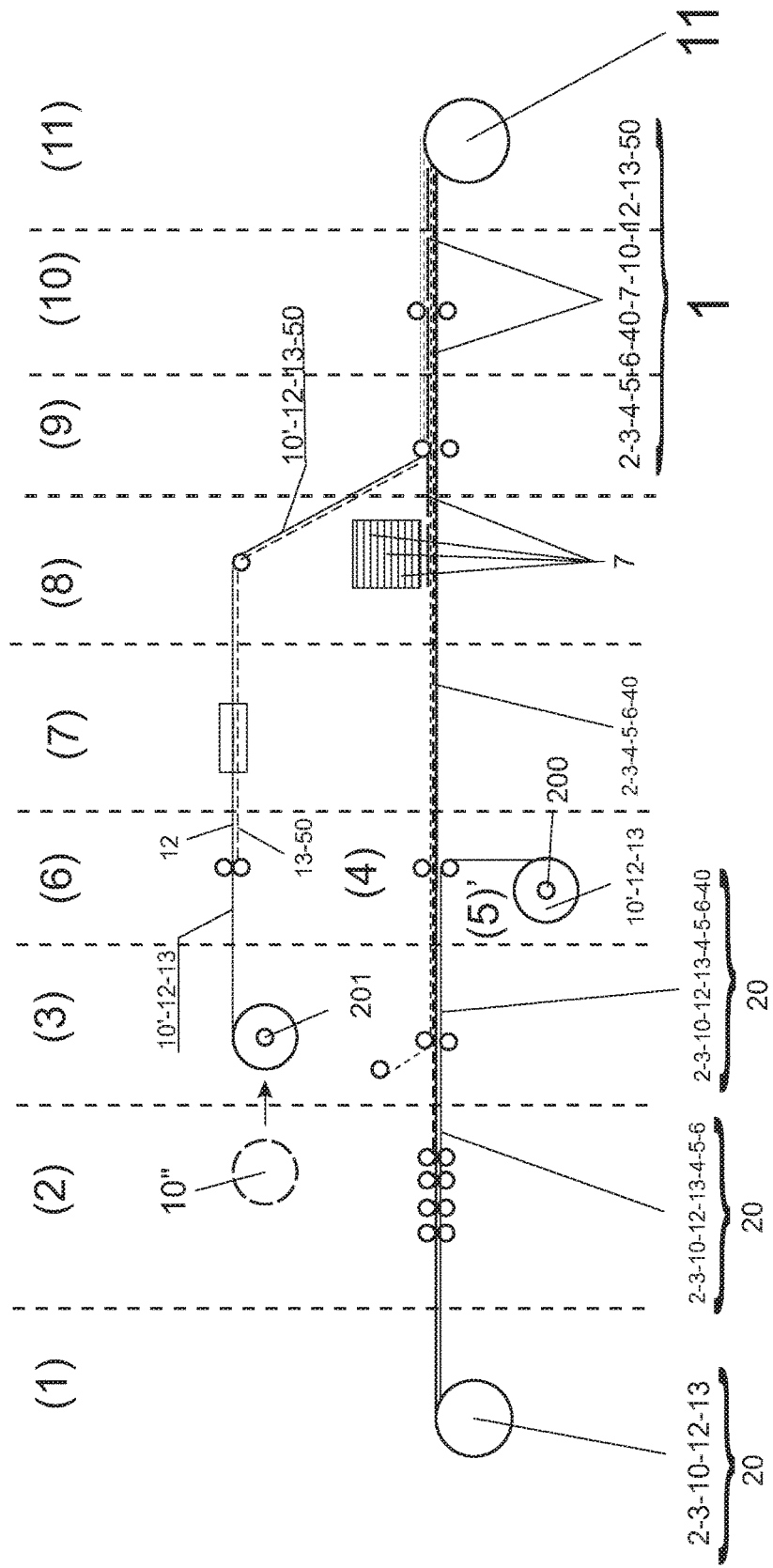
FIG. 2C shows a lateral view of a scheme of a second optional version of the process similar to FIGS. 2A and 2B;—

Optionally, the process can be according to the scheme of FIG. 2C, in which the steps 1, 2, 3, 4, 6, 7, 8, 9, 10, 11 are the same as previous embodiments, but contemplating the replacement of step 5)—Inverting the position of the liner 10 in relation to the remaining of the self-adhesive material tape 20 with step 5)'—Rewinding the liner in an additional rewinder 200, forming a temporary reel of liner 10' which, after being formed, is transferred to an additional auxiliary unwinder 201, from which the temporary liner tape 10' is unwinded, goes through the steps of: 6)—Applying water-based self-adhesive layer, solvent based or UV 50 on the face of the liner 10' containing Corona treatment 13; 7)—Applying UV drying or heat drying; and 9)—Relaminating the liner 10', thus forming the linerless self-adhesive label tape 1, which goes to regular final steps 10 and 11 of the process.

To perform this version of the process and ensure it is continued, it is contemplated to additionally provide, in the beginning of the process, a virgin liner reel 10" treated with the Corona treatment 13 on the face opposite to the silicone 12 and contemplate the step of assembling said treated virgin liner reel 10" in the additional auxiliary unwinder 201 and contemplate the steps 1)'—Unwinding the treated virgin liner tape 10" from this and subsequent steps of 6) Applying the adhesive; 7) Drying the adhesive and 9) Relaminating as common in the process.

When starting the process, the formation of the temporary liner reel 10' occurs concomitantly in the auxiliary rewinder 200, obtained from the delamination of the self-adhesive material liner 20, and, in the auxiliary unwinder 201, the consumption of treated virgin liner reel 10" that is applied to the formation of the linerless leaflet-label tape 1 and in the end, the empty reel of the treated virgin liner 10" is disassembled from the auxiliary unwinder 201 and a temporary liner reel 10' formed is assembled thereon, and a new reel is assembled to the auxiliary rewinder 200 where the new temporary liner reel 10' will be formed, thus providing the process with characteristics of a continuous process.

NOMENCLATURE

1—Self-adhesive linerless leaflet-label tape;—
2—Adhesive layer;—
3—Self-adhesive material tape;—
4—Label;—
5—Separating band between labels;—
6—Sensing mark;—
7—Leaflet;—
8—Extreme bands of the back cover of the label and left side of the label permanently bonded or left strip permanently bonded in the range of the adhesion control layer incorporated on the left band of the extended label out of under the label;—
9—Extreme strips of the label and label right sides are resealably affixed or a right band adhered resealably in the range of the adhesion control layer incorporated in the right side of the label extended out from under the label;—
10—Liner;—
11—Reel;—
12—Silicone;—
13—Surface of the liner with Corona treatment;—
20—Reel of self-adhesive material;—
30—Paper tape—
31—Printed layers (of the leaflet);
32—Transverse fold creases (of the leaflet);—
40—Adhesion control layer;—
50—Adhesive layer (face of the liner with Corona treatment);—
10'—Liner or reel of liner re-usable;—
10"—Liner or treated virgin liner reel;—
200—Auxiliary rewinder;—
201—Auxiliary unwinder.

The invention claimed is:

1. A method for generating a self-adhesive leaflet-label tape, comprising:
unwinding a self-adhesive material tape that comprises a face side and a rear adhesive side;
printing a plurality of labels and sensing marks on the face side of the self-adhesive material tape to generate a printed self-adhesive material tape comprising printed labels separated by a plurality of bands and the sensing marks;

applying an adhesion control layer on the face of the printed self-adhesive material tape;

delaminating a liner from the printed self-adhesive material tape to form a liner with a silicone face and a Corona face treatment;

inverting a position of the liner relative to the printed self-adhesive material tape;

diverting the liner from out of under the face of the printed self-adhesive material tape and moving the liner to a position above an opposite face of the printed self-adhesive tape;

diverting the liner again to a position aligned with and above the printed self-adhesive material tape, thus maintaining the face containing the silicone opposed to the printed self-adhesive material tape and the opposite face containing the Corona treatment facing said tape;

applying a self-adhesive layer to the liner to create a pressure-sensitive rear adhesive layer;

drying the pressure-sensitive rear adhesive layer;

applying a plurality of leaflets successively over the adhesion control layer of the printed self-adhesive material tape; and relaminating the liner to bond the adhesive layer as a cover for the leaflets so as to produce a tape without backing and protection tape.

2. The method as set forth in claim 1, wherein applying an adhesion control layer on the face of the printed self-adhesive material tape comprises one of:

laminating a transparent adhesive BOPP film tape on the face of the printed self-adhesive material tape; or applying a varnish of silicone or similar coating.

3. The method as set forth in claim 1, wherein applying a self-adhesive layer to the liner to create a pressure-sensitive rear adhesive layer comprises:

applying water-based, solvent-based or UV self-adhesive layer to the face of the liner with the Corona treatment.

4. The method as set forth in claim 3, further comprising:

providing a virgin liner reel treated with a Corona treatment on the face opposite to the silicone;

assembling the treated virgin liner reel in the additional auxiliary un-winder concomitantly to the step of forming the temporary liner reel performed in the auxiliary re-winder;

transferring to the un-winder a temporary liner reel formed; and starting the formation of a new temporary liner reel in the auxiliary re-winder.

5. The method as set forth in claim 1, further comprising:

inverting the position of the liner after delamination, in relation to the remainder of the self-adhesive material tape, lowering the liner so as to maintain alignment under the self-adhesive material tape;

diverting the liner and placing the liner in counter flow of the self-adhesive material tape until the position anterior to the unwinding axis;

diverting the liner and placing the liner in the position aligned and above the position of the self-adhesive material tape, in which the liner comprises the silicone surface opposite to the self-adhesive material tape and the opposite surface with Corona treatment facing the latter; and diverting the liner to the same direction as the self-adhesive material tape.

6. The method as set forth in claim 1, wherein delaminating a liner from the printed self-adhesive material tape comprises:

re-winding the liner in an additional re-winder; and forming a temporary reel of liner which, after being formed, is transferred to an additional auxiliary un-winder, from which the temporary liner tape is unwinded.

* * * * *